United States Patent
Yuen

[19]

[11] Patent Number: 6,132,611
[45] Date of Patent: Oct. 17, 2000

[54] DYNAMIC ACTION FILTRATION SYSTEM

[76] Inventor: Po S. Yuen, 99 Edgemont Rd., Scarsdale, N.Y. 10583

[21] Appl. No.: 09/223,560

[22] Filed: Dec. 31, 1998

Related U.S. Application Data

[63] Continuation-in-part of application No. 08/825,703, Mar. 19, 1997, abandoned
[60] Provisional application No. 60/013,661, Mar. 19, 1996.

[51] Int. Cl.$^7$ .............................. B01D 24/36; B01D 36/02
[52] U.S. Cl. ......................... 210/266; 210/285; 210/288
[58] Field of Search .................................... 210/661, 668, 210/757, 758, 263, 266, 288, 290, 503, 285

[56] References Cited

U.S. PATENT DOCUMENTS

| | | | |
|---|---|---|---|
| 1,058,113 | 4/1913 | Stuckel | 210/501 |
| 1,428,618 | 9/1922 | Wagner | 210/767 |
| 1,671,864 | 5/1928 | Higgins | 210/661 |
| 3,173,862 | 3/1965 | Clements et al. | 210/661 |
| 3,420,709 | 1/1969 | Barrett et al. | 210/503 |
| 3,458,436 | 7/1969 | Martinola et al. | 210/661 |
| 3,529,719 | 9/1970 | Graybill | 210/719 |
| 3,575,853 | 4/1971 | Gaughan et al. | 210/667 |
| 3,617,580 | 11/1971 | Geyer et al. | 210/757 |
| 3,697,567 | 10/1972 | Taylor | 210/702 |
| 3,766,036 | 10/1973 | McKaveney | 204/150 |
| 4,053,408 | 10/1977 | O'Cheskey | 210/786 |
| 4,078,040 | 3/1978 | Milkov et al. | 423/102 |
| 4,219,419 | 8/1980 | Sweeny | 210/503 |
| 4,382,865 | 5/1983 | Sweeny | 210/743 |
| 4,599,177 | 7/1986 | Hayashi et al. | 210/718 |
| 4,624,789 | 11/1986 | Fan et al. | 210/661 |
| 4,642,192 | 2/1987 | Heskett | 210/638 |
| 5,089,141 | 2/1992 | Murphy | 210/719 |
| 5,122,274 | 6/1992 | Heskett | 210/638 |
| 5,135,654 | 8/1992 | Heskett | 210/638 |
| 5,149,437 | 9/1992 | Wilkinson et al. | 210/665 |
| 5,198,118 | 3/1993 | Heskett | 210/638 |
| 5,250,187 | 10/1993 | Franks | 210/288 |
| 5,269,932 | 12/1993 | Heskett | 210/638 |
| 5,275,737 | 1/1994 | Heskett | 210/638 |
| 5,314,623 | 5/1994 | Heskett | 210/638 |
| 5,332,509 | 7/1994 | Murphy | 210/719 |
| 5,368,705 | 11/1994 | Cassidy | 204/136 |
| 5,401,416 | 3/1995 | Levy | 210/668 |
| 5,433,856 | 7/1995 | Heskett | 210/638 |
| 5,510,034 | 4/1996 | Heskett | 210/638 |
| 5,543,059 | 8/1996 | Howson et al. | 210/757 |

*Primary Examiner*—Ivars Cintins
*Attorney, Agent, or Firm*—Shlesinger, Arkwright & Garvey LLP

[57] ABSTRACT

A filtering device for removing contaminants from fluids, comprising a container having an interior chamber with a volume, at least one inlet, at least one outlet and at least one substantially non-granular material adhering outlet filter and at least one type of granular material occupying about 20 percent to about 67 percent of the volume of the container, the granular materials being agitated by the fluid entering the chamber through the inlet and exiting the chamber through the outlet with the outlet filter preventing the granular media from escaping the container, whereby the contaminants being removed from the fluid by the fluid agitating the granular materials and the contaminants are kept within the outlet screen.

37 Claims, 9 Drawing Sheets

DYNAMIC ACTION FILTRATION SYSTEM

FILE HISTORY

This application is a continuation-in-part of Ser. No. 08/825,703 filed Mar. 19, 1997 now abandoned.

This application is based also on Provisional Application Ser. No. 60/013,661, filed Mar. 19, 1996.

FIELD OF THE INVENTION

This invention relates generally to filtration systems and more particularly to a dynamic action filtration system for household use.

HISTORY—DEVELOPMENT

Over the years there have been numerous attempts to filter fluids and in particular to filter drinking water in households. Such attempts includes dripping or allowing a fluid to flow slowly through a container packed with carbon granules. There have also been other types of filters such as mesh or screen filters and some made of fabric or a textile material.

However, all of these attempts have been static in design and the fluid must flow slowly through the filter in order to be cleaned.

These attempts have failed to provide an efficient filtering system, which provides an acceptable amount of contaminant removal with the use of the least amount of filtering materials. In most urban areas, water pressure runs between about 20 to 100 psi. Filtering at faucets in the kitchen or elsewhere in the home for cooking of drinking purposes requires steady and regular flow. The prior art tended to reduce flow rates, particularly in low water pressure areas. This is an annoyance to the general public.

It is important to distinguish the terms "fluidizations" and "dynamic action." Some prior art filters allow for limited movement of the filter granules used. The entire filter area is filled with particles which tend to separate slightly when a fluid is passed therethrough using a slight agitation or movement in the filter medium. With "dynamic action", the filter particles separate and move great distances and are not maintained in place as with "fluidization". The particles bounce around and move from one area of the container to another. "Fluidization" has a flow rate less of than 1.5 to 2.5 liters per minute for about 2½" ID container, whereas dynamic action flow rate is from about 2.5 to 5 liters per minute (lpm). Above 5 liters, a stronger screen is required and the filter media starts to cling to the screen.

OBJECTS AND SUMMARY OF THE INVENTION

It is an object of the present invention to provide a dynamic action filtration system, which substantially provides longer life to the filtering medium and decontaminates a larger volume of fluid.

Another object of this invention is to provide a dynamic action filtration system, which will be more efficient than a conventional household drinking water filter system.

Yet another object of this invention is to provide a dynamic action filtration system, which provides a substantially higher flow rate of a fluid than previous systems.

Still a further object of this invention is to provide a dynamic action filtration system, which allows the filtering mediums to be more efficiently used.

Yet another object of this invention is to provide a dynamic action filtration system, which can be modified for household use or for large scale uses such as municipal use.

Still a further object of this invention is to provide a dynamic action filtration system, which is inexpensive to manufacture, and maintain.

Another object of this invention is to provide a household filter system which will maintain a regular flow of tap water even when under low pressure conditions.

A further object of this invention is to provide a filter system which avoids substantial clogging due to the dynamic action of the filter media.

Another object of this invention is to provide a filter system which operates in the water pressure range of about 20 to 100 psi.

DETAILED DESCRIPTION OF THE INVENTION

Figure 1:
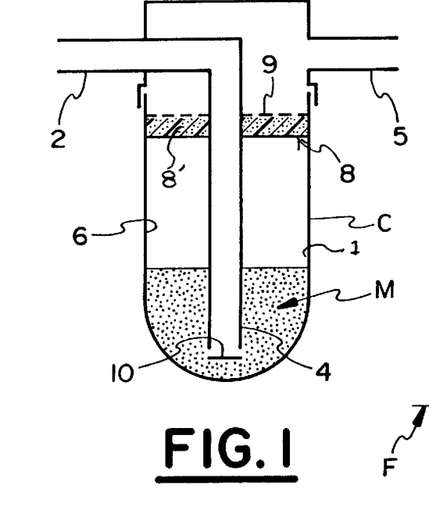
FIG. 1 is a schematic view of the chamber with a media shown in a non-agitated state.
Figure 2:
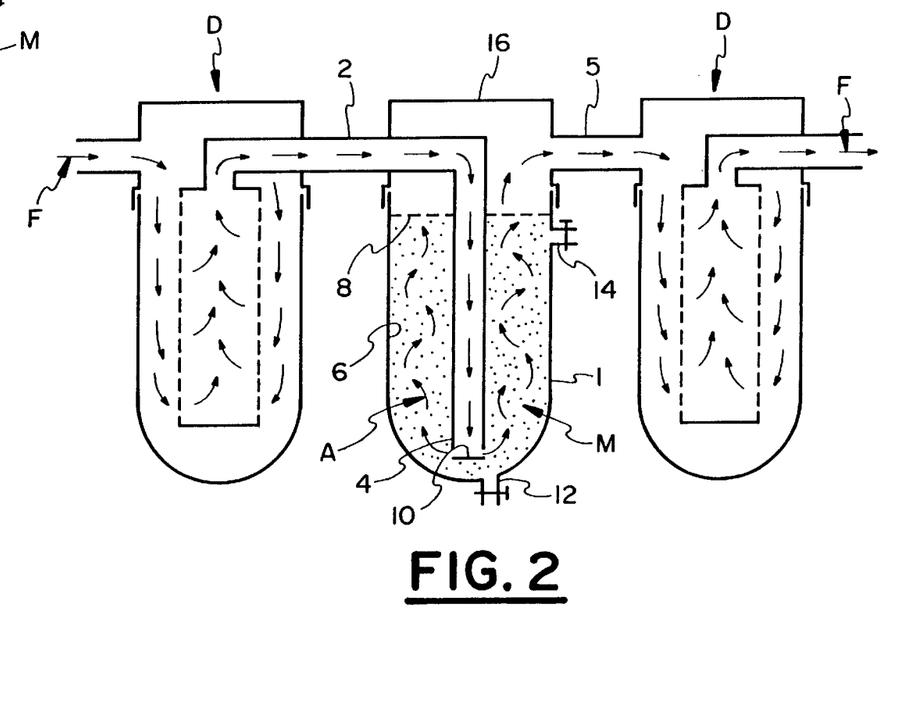
FIG. 2 is a schematic view representing the combination of a series of filters with the present invention filter being disposed between two conventional filters.

FIGS. 1 and 2

Referring to FIG. 1, container C is shown having a side wall 1. The container C is comprised of an inlet 2, having inlet end 4, an outlet 5, and interior chamber 6 and a substantially non-granular material adhering outlet filter or screen 8 as generally shown. The inlet 2 has an internal diameter (ID) of not less than about 1/8", as 1/16" is too small. Normal inlet size would be about 1/2" to about 3/4" with a preferred width of about 1/2". Within the chamber 6, there is a media M of a substantially non-clumping, non-sticking, non-interlocking granular material. The filtering media M mesh size is from about 80 to about 120 mesh with 100 mesh being preferred.

As shown in FIG. 1, the screen 8 may comprise an outlet or filter screen 8' of a firm sponge material of about 1/4" to about 1/2" thickness having a mesh of between about 60 to 100 with a preferred range of about 80 mesh.

A second stiff filter screen 9 provides back-up strength to screen 8'. Screen 9 has a mesh size from about 100 to 150 with a preferred mesh size of 120. Particles are not likely to reach screen 9 during dynamic action because of the thickness of the foam. The inlet 2 extends axially into said container C and is of a width substantially less that the width of said container C.

The container C should have an internal diameter of between about 2" to about 12". Preferably, about 4" to about 8" diameter will permit maximum dynamic action when in use. This invention pertains to filtering fluids whereby the cleaning media or material M is not static or compressed. In other words, it is not designed for a fluid to drip through it. Rather, the present invention is designed so that the media M can be agitated by the fluid and thus clean the fluid.

Referring to FIG. 2, the present invention is shown schematically in series with two conventional filtering devices D. Note, the combination of the two conventional filters D and the present invention are shown with the present invention between the two conventional filters D. However, it is noted that the arrangement can be in any order, as will be shown further below.

In FIG. 2, the fluid F flows through a first conventional filtering device D and then flows through the inlet 2 and flows into the interior chamber 6 to agitate the media M. This agitation A will remove or separate contaminants from the fluid F. By this agitation A, the media M cleanses the fluid in a dynamic fashion. With a constant in-flow of fluid F, the fluid will be forced out of the outlet 4. The media M will not be allowed to escape the interior chamber 6, owing to the placement of screen 8, which is a screen or filter of a size to prevent the media M from escaping the interior chamber 6.

Note in FIGS. 1–20 a baffle 10 is spaced from and located at the end of the inlet 2 in order arrest axial flow of said fluid F and to laterally spread or force the fluid F toward the side wall 1 of the container C in a manner to facilitate the agitation A of the media M. It is understood that the baffle 10 could be omitted from the system and other means used as will be subsequently described in FIGS. 21 and 22.

Note the container C is also shown in FIG. 2 with a drain 12 and a top drain 14. In other words, the drains 12 and 14 allow for easy removal of filtered contaminants. Note, this is very well known in the art and is referred to as skimming-off contaminants. Also note, one may also employ some type of screen or filter, not shown, in conjunction with each of the drains 12 and 14 in order to prevent the media M from escaping.

Furthermore, it is understood that there could be many ways to remove the contaminants, thus drains 12 and 14 are not absolutely necessary.

Further note, the dynamic action filtration system could also include a cap or top 16. This top 16 will facilitate in cleaning any of the components of the screen or filter 8 as well as allow for removal of the contaminants. It is understood that the system does not need to have a separate top 16.

It is critical in that the media M does not occupy, when in a static condition, the entire volume of the interior chamber 6. Conventional cleaning filters occupy substantially all of the container that they are housed in. Thus, the fluid F trickles through the media M, and the media M is not agitated. The problem or inconvenience with the conventional type cleaning filtering is it takes a substantial amount of time for the fluid to drip or drain through the media. Furthermore, the media M over time may become coated or saturated as the case may be with the contaminants thus shortening the filtering life of the media M.

To obviate these deficiencies in the conventional filters, the present invention allows for a faster flow rate of fluid F and provides a longer filtering life for the media M. In order to accomplish these goals, it is pertinent that the media M occupy about 20 percent to about 67 percent of the volume of the container C, as shown in FIG. 1. With this type of arrangement, the media will be agitated by the fluid F entering the chamber through the inlet 2 and exiting the chamber through the outlet 4. This agitation will remove contaminants from the fluid F. Note, it is further preferred that the media occupy about 35 percent to about 40 percent of the volume of the container C.

The media can be of any numerous types of materials and is preferably of a granular form. For example, the granular media M can be activated carbon, an ion-exchange resin, manganese green sand or a redox couple, such as copper-zinc. If the fluid is drinking water, then the media M can be merely any dynamic active granular material that is not hazardous to human health. Note, the media M could be mixture of any of the above or be mixed with a fluid additive which would enhance the properties of the fluid F. The size of the granular media M should be about 80 mesh to about 120 mesh and the outlet screen 8 or any other screen preventing the media from escaping a chamber 6 should always have a greater mesh size than the granular media M. The outlet screen 8 also keeps the contaminants from escaping the chamber 6, depending on the type of media M used as will be discussed below. The screen 8 causes the media M to stay in an agitated condition without clogging the screen.

Note, this invention is designed so that the outlet filter 8 will not be clogged with the media M. If the flow of fluid is strong or high, then some granules of the media M may accumulate against the screen. However, the system will still operate since a high percentages of the granules will be bouncing around, i.e. dynamic, knocking some of the granules loose. In addition, the granules of media M are of a size, such that if they are resting on screen 8, they will still allow the fluid F to pass. If the fluid flow is normal or low, the granular media M would fall due to gravity. Furthermore, it is preferred that the system be designed with the outlet screen 8 disposed in a position so that the media M never even reaches the outlet screen 8.

Tests have shown that the present invention can use the same amount of material or media that is used in the conventional household cartridge type filters and still function about 10 times more effectively than the conventional cartridges because the media M will be fully utilized. In other words, as mentioned above, in conventional cartridges, which are static, the media M becomes covered or coated with contaminants only in certain areas. Being coated with contaminants, the media within the conventional cartridge is then less effective as large areas of media are not utilized. The present invention is dynamic, thus helping to permit contaminants to engage the entire surface areas of the media particles. Furthermore, because the granular media is dynamic, in essence, the media M, which bounces into each other and off the walls, cleans itself particularly with those granules such as copper-zinc, which react to form non-injurious compounds to health. For example, a common conventional copper-zinc static filtering cartridge filters can filter approximately 1,500 gallons without any detectable chlorine.

Note, the non-injurious compounds, not shown, are often of a size to be able to pass through screen 8 with the fluid F.

The ion exchange material may be such as that which can be back-washed by a salt solution to remove the contaminants from the ion exchange resin to rejuvenate the resin. The activated carbon can be replenished periodically as well as the copper-zinc.

FIGS. 3–20

FIGS. 3 through 20 represent various schematic representations of combinations of conventional filters D and the present invention. It may be desirable, as shown in these figures, to combine conventional filters with the present invention to further refine or further filter a fluid. These figures are shown only to illustrate the types of combinations that could be employed. It is understood though, that there could be an infinitesimal amount of combinations of any common filter and the present invention.

Figure 3:
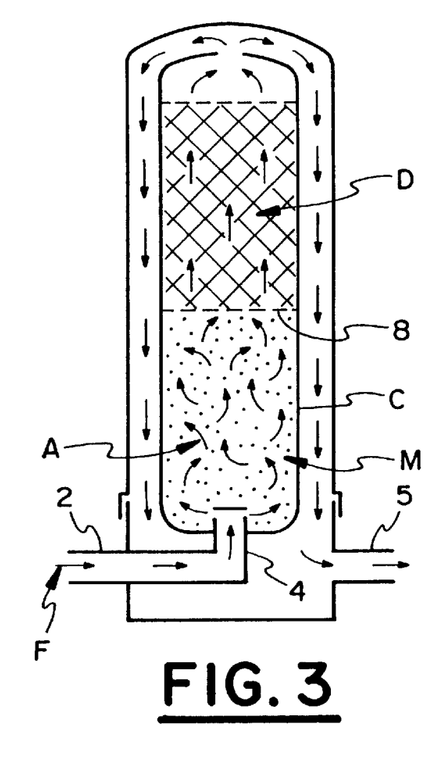
FIG. 3 is a schematic view showing the present invention combined with a conventional filter.

FIG. 3 shows the fluid F flowing through the present invention, a dynamic action filter, which agitates the media M, and then flows through a screen 8 into a conventional filter D.

Figure 4:
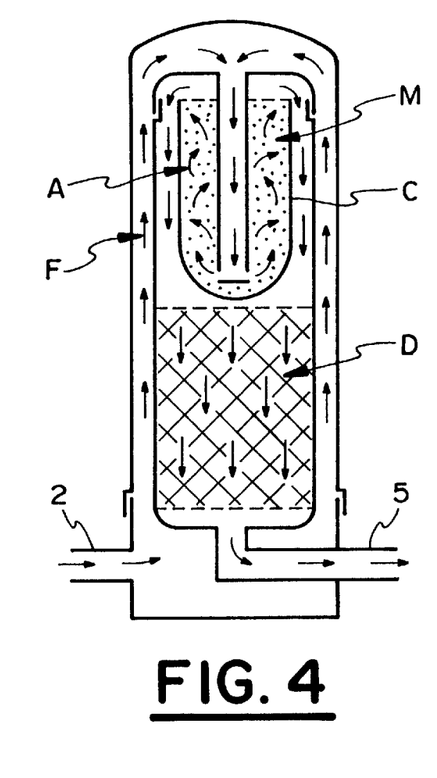
FIG. 4 is a schematic view showing the present invention in combination with a conventional filter.

FIG. 4 is a similar arrangement as FIG. 3, simply showing a different combination.

Figure 5:
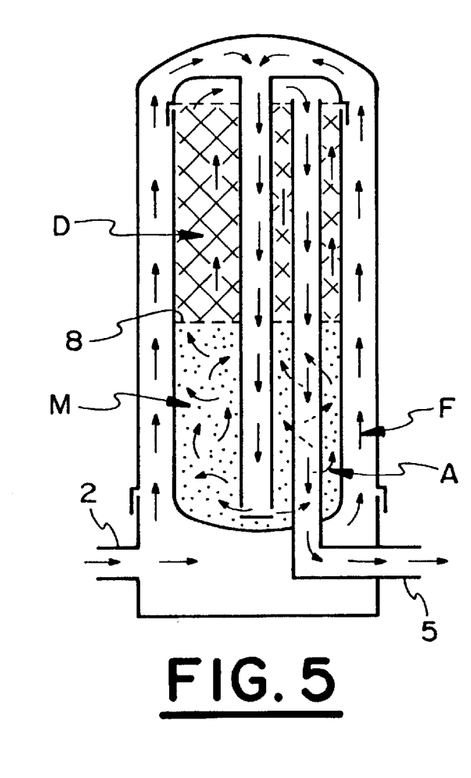
FIG. 5 is a schematic view showing another possible combination of the present invention with a conventional filter.

FIG. 5 is also a similar arrangement to that of FIG. 3, showing a different combination.

Figure 6:
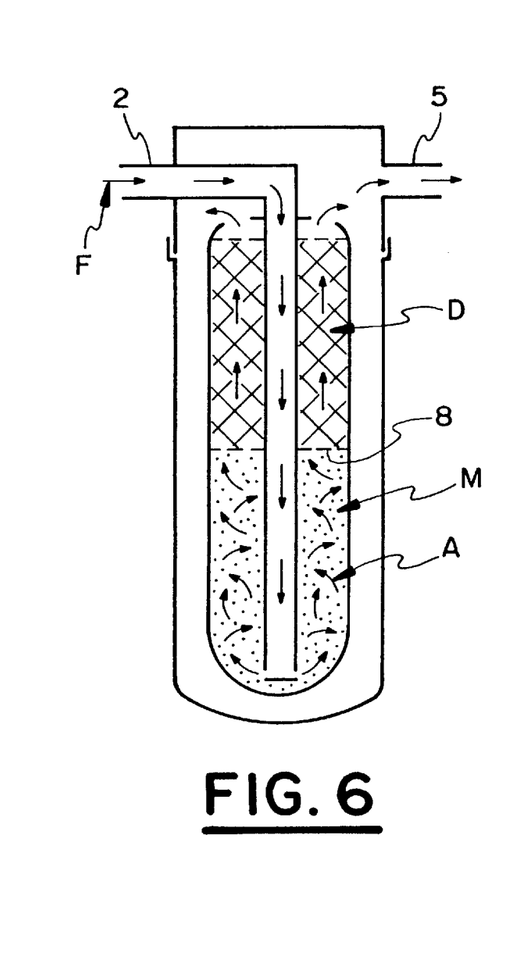
FIG. 6 is a schematic view showing another possible combination of the present invention with a conventional filter.

FIG. 6 is a similar arrangement to that of FIG. 3, showing a different combination.

Figure 7:
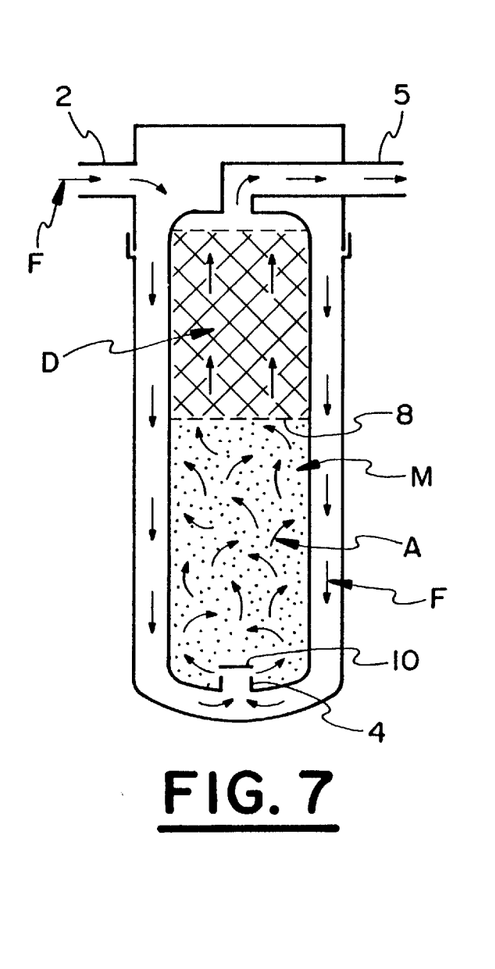
FIG. 7 is a schematic view showing another possible combination of the present invention with a conventional filter.

FIG. 7 shows a combination of a dynamic action filter with a conventional filter D.

Figure 8:
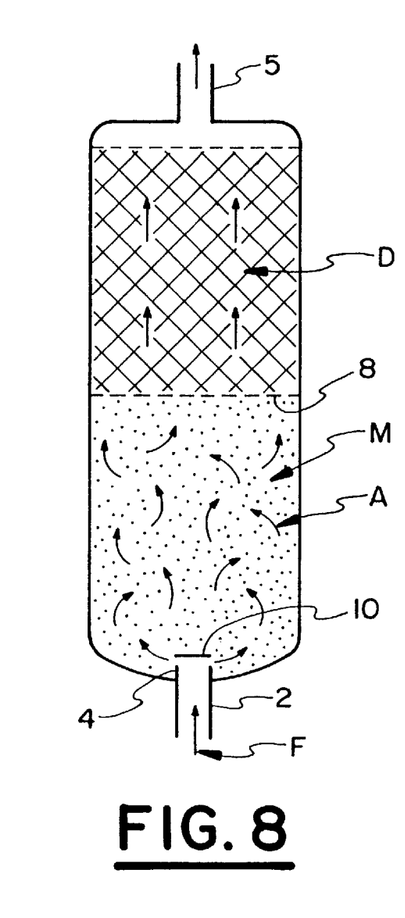
FIG. 8 is a schematic view showing another possible combination of the present invention with a conventional filter.

FIG. 8 is a simple arrangement whereby the fluid F enters an inlet 2 agitates the media and then flows through the outlet filter 8 and through a conventional filter D and then out of the system.

Figure 9:
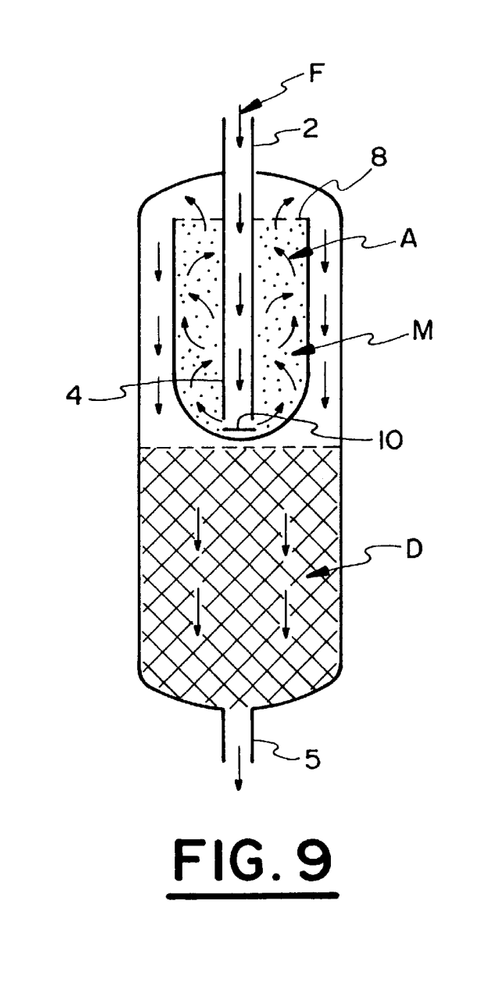
FIG. 9 is a schematic view showing another possible combination of the present invention with a conventional filter.

FIG. 9 is a modification to the arrangement shown in FIG. 3.

Figure 10:
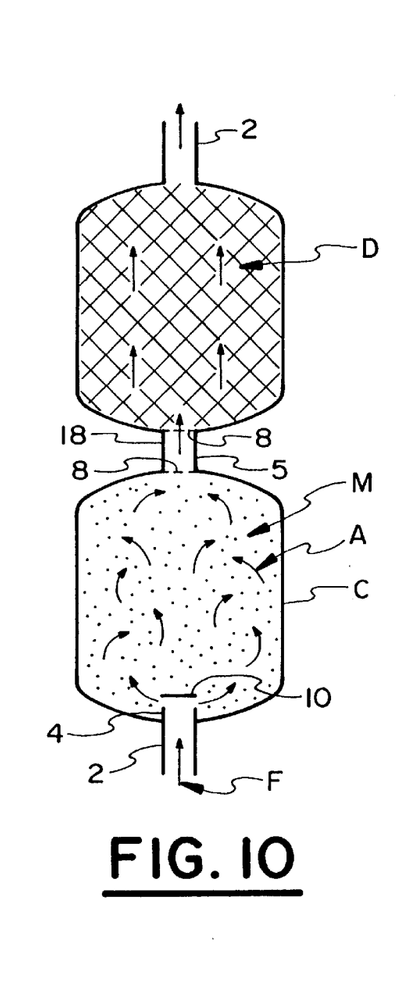
FIG. 10 is a schematic view showing another possible combination of the present invention with a conventional filter.

FIG. 10 is a simply arrangement whereby the fluid F enters a container C and runs into a baffle 10, agitates the media M and then flows out of the container through outlet 18 and then into a conventional filter D.

Figure 11:
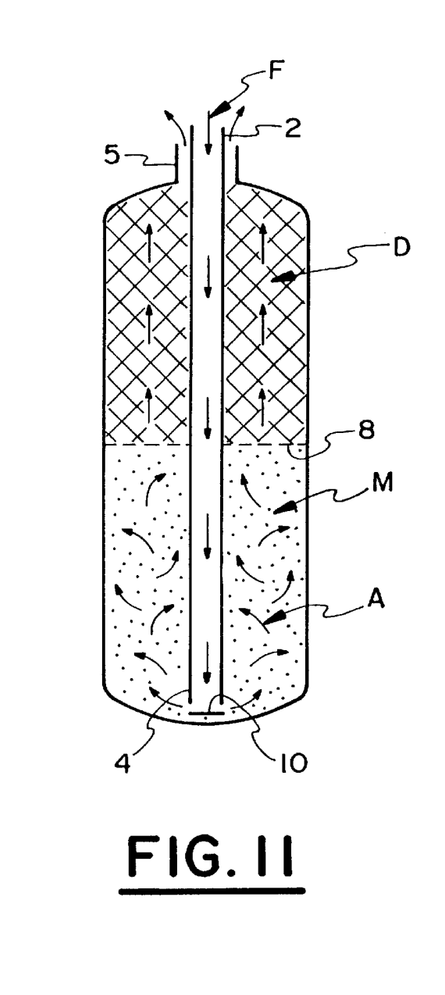
FIG. 11 is a schematic view showing another possible combination of the present invention with a conventional filter.
Figure 12:
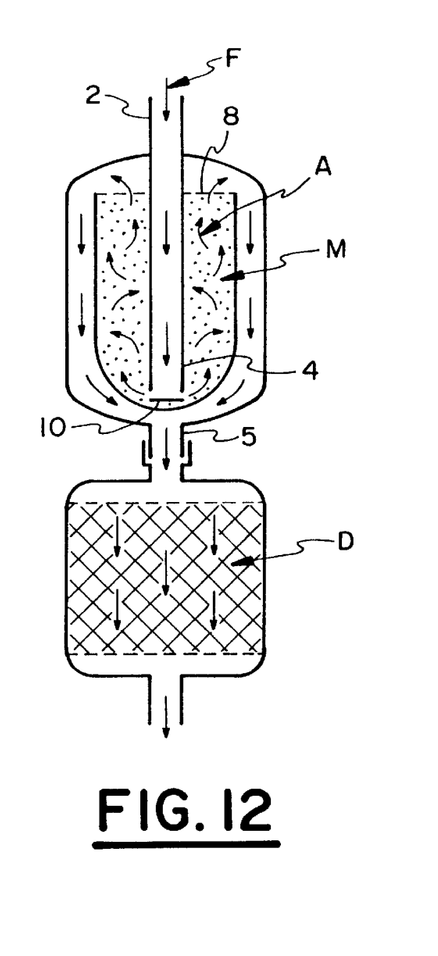
FIG. 12 is a schematic view showing another possible combination of the present invention with a conventional filter.

FIGS. 11 and 12 are various modifications to the arrangement of the common filtering device D and the present invention, a dynamic action filter.

Figure 13:
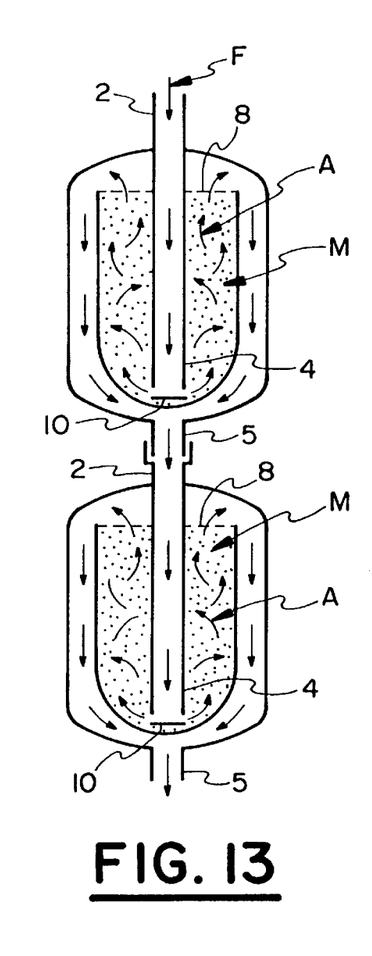
FIG. 13 is a schematic view showing a series of filters, whereby the present invention is placed in series.

FIG. 13 illustrates the ability to combine the present invention in a series relationship. In other words, fluid F would pass the fluid through the media M and clean it by agitating the media M, and then further clean the fluid F by passing it through another container whereby a media M will be agitated.

Figure 14:
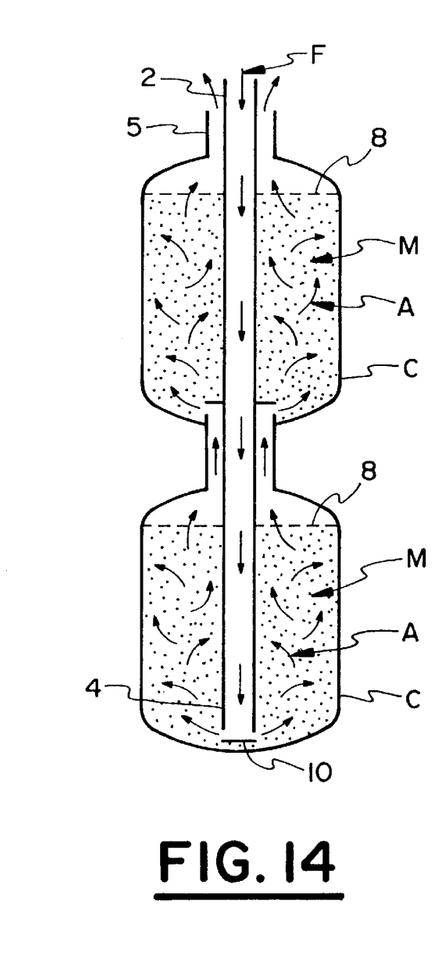
FIG. 14 is a schematic view showing another possible combination, whereby the present invention is placed in series.

FIG. 14 is a modification to the arrangement shown in FIG. 13.

Figure 15:
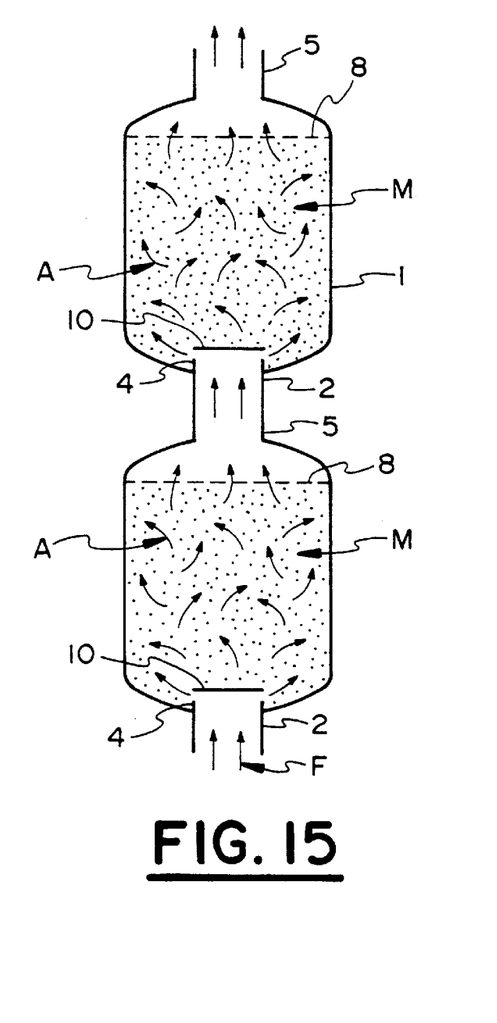
FIG. 15 is a schematic view showing another possible combination, whereby the present invention is placed in series.

FIG. 15 is also similar to the arrangement shown in FIG. 13.

Figure 16:
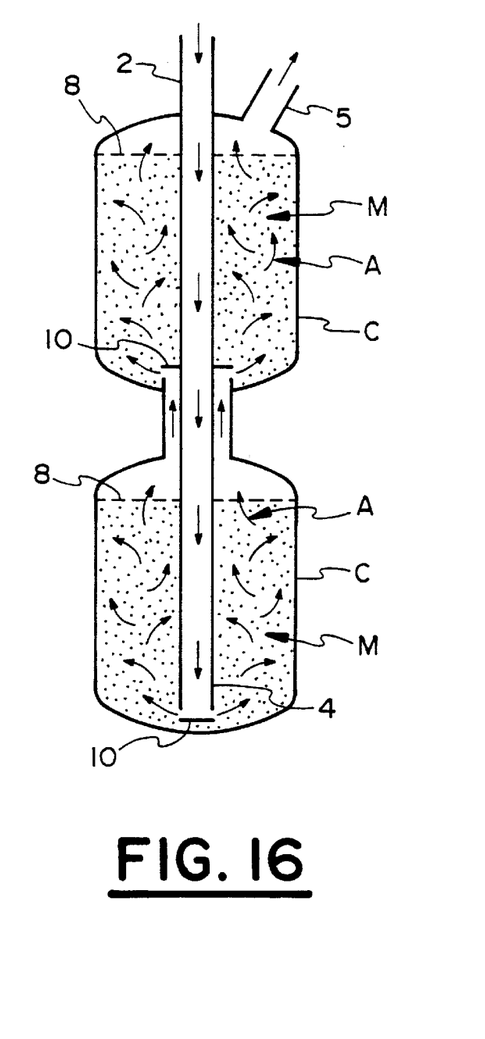
FIG. 16 is a schematic view showing another possible combination, whereby the present invention is placed in series.

FIG. 16 is a modification of to the arrangement shown in FIG. 15.

Figure 17:
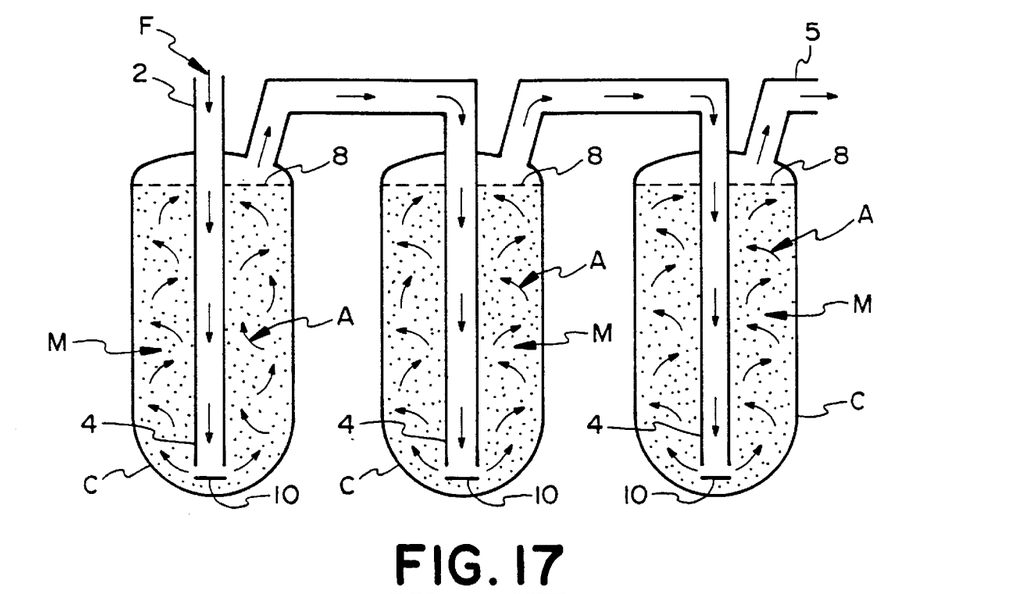
FIG. 17 is a schematic view showing the present filter in combination with three of the present filters.

FIG. 17 is similar to the previous arrangements, but here it shows a fluid being filtered by the present invention three times.

Figure 18:
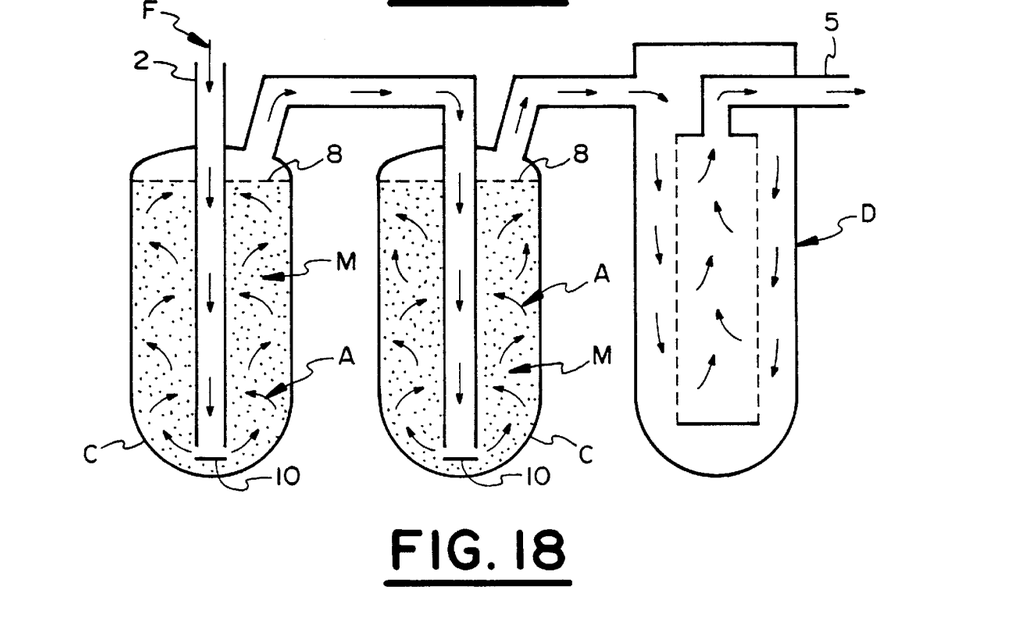
FIG. 18 is a schematic view representing three filters of the present invention in combination.

FIG. 18 shows a series relationship whereby the fluid F is filtered by the present invention twice and then for further filtering, it is run through a common or conventional filtering device D.

Figure 19:
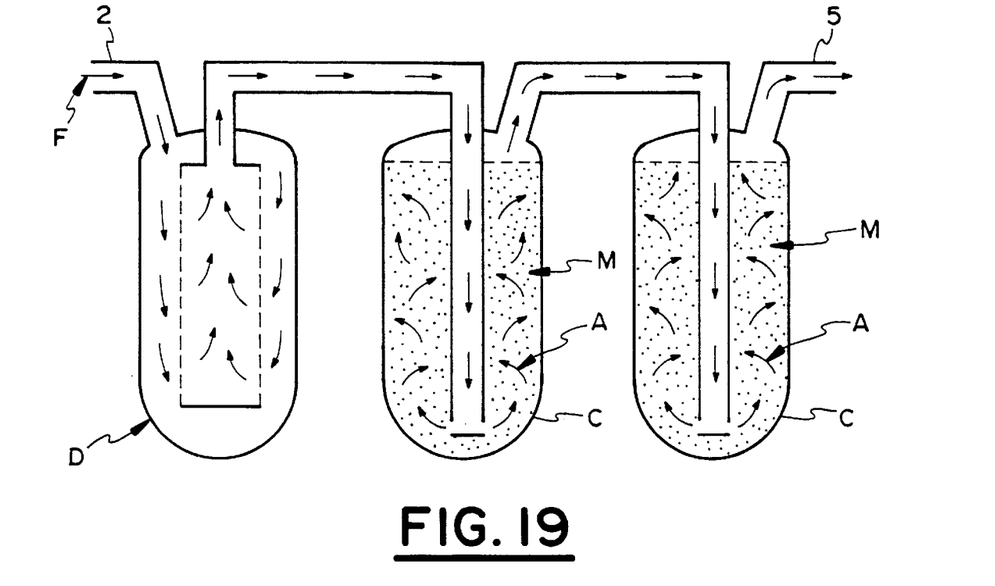
FIG. 19 is a schematic view representing three filters of the present invention in another combination.
Figure 20:
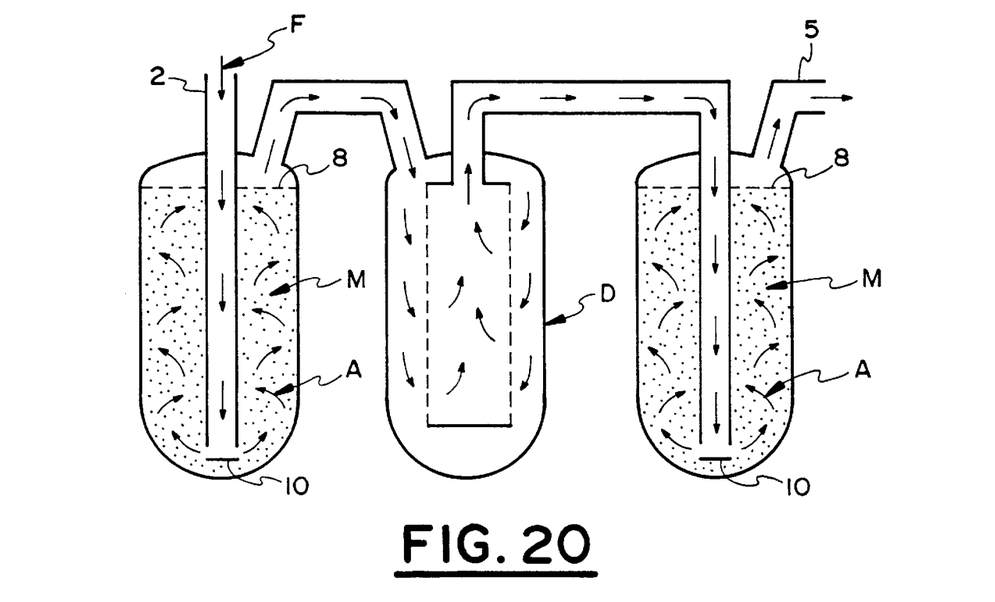
FIG. 20 is a schematic view representing three filters of the present invention in another combination.

FIGS. 19 and 20 are similar to that of FIG. 18 but the order of filtering has changed. Namely, in FIG. 19, the fluid F first goes through a common or conventional filter D and then through the two dynamic action filters. In FIG. 19, the fluid first goes through dynamic action filter, then through a conventional filter D and then finally through another dynamic action filter.

In FIGS. 1, 2, 4–6, 9, 11–14, 16–20, the inlet 2 extends from the top of the container C to adjacent the bottom of the container C.

In FIGS. 3, 8, 10, and 15, the inlet 2 extends upwardly a short distance from the bottom of the container.

Figure 21:
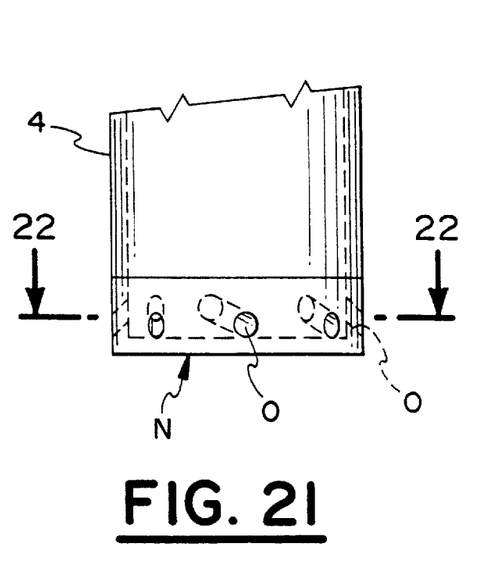
FIG. 21 is an enlarged side elevation of a modified inlet end showing spray openings.
Figure 22:
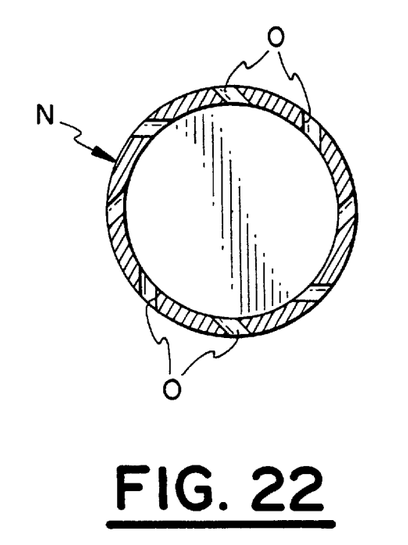
FIG. 22 is a cross sectional view of FIG. 21 taken along the lines of 22—22 and viewed in the directions of the arrows.

FIGS. 21 and 22

In FIGS. 21 and 22, the baffle 10 at the inlet end 4 in the FIGS. 1 through 20, is replaced by a nozzle N having angularly downwardly directed spaced orifices O. Orifices O provide a downward swirling action to the water entering into the canister or container C. The nozzle N may be secured to the inlet 4 by threading (not shown) or welding (not shown) or other attachment means or may be swaged on the end 4. The nozzle N has about 4 to about 12 orifices O of about $\frac{1}{32}$" to about $\frac{1}{16}$" diameter although for larger nozzle N, more orifices may be used. For a pressure of about 40 psi, the flow rate will be about 2 to 5 liters per minute.

A person of ordinary skill in the art will understand that the filter of the present invention will allow for more efficient filtering because of the dynamic action of the filtering media. It is understood that a standard vibration mechanism, not shown, could be employed to provide vibration to the container C and/or the screen 8 or other portion, which will in turn provide further agitation of the granular material M. This will also help prevent the granular material M from clogging at the outlet screen 8.

While this invention has been described as having a preferred design, it is understood that it is capable of further modification, uses and/or adaptions following in general the principle of the invention and including such departures from the present disclosure as come within known or customary practice in the art to which the invention pertains, and as may be applied to the essential features set forth, and fall within the scope of the invention or the limits of the appended claims.

I claim:

1. A filtration device operating in the range of about 20 to about 100 psi for removing contaminants from fluids, comprising:
   a) a container having an interior chamber with a volume, an interior wall, at least one inlet, at least one outlet and at least one screen;
   b) a dynamic granular bouncing, non-clumping, non-sticking, non-interlocking, non-clinging material occupying about 20% to about 67% of said volume of said container;
   c) said at least one outlet screen causing said dynamic granular bouncing, non-clumping, non-sticking, non-interlocking, non-clinging material to stay in an agitated condition without clogging said at least one outlet screen;
   d) said dynamic granular material having a mesh size of from about 80 to about 120;
   e) said at least one inlet having an inlet end extending into said container;
   f) said inlet and said inlet end having an ID of not less than about ⅛" and up to about ¾";
   g) said container have an ID of between about 2" to about 12";
   h) a diffusing agitating means located at said inlet end for arresting axial flow of said fluid from said inlet end and deflecting said fluid laterally of said inlet end toward said interior wall of said container;
   i) said at least one outlet screen having a mesh size of between about 100 to about 150;
   j) another outlet screen adjacent said outlet screen;
   k) said another outlet screen being a spongy material;
   l) whereby when fluid is admitted into said container said contaminants are removed from said fluid by the dynamic agitation of said dynamic granular material.

2. A filtration device as recited in claim 1, wherein:
   a) said dynamic granular material occupies from about 35% to about 40% of said volume of said container.

3. A filtration device as recited in claim 1, wherein:
   a) said dynamic granular material is activated carbon.

4. A filtration device as recited in claim 1, wherein:
   a) said dynamic granular material is an ion-exchange resin.

5. A filtration device as recited in claim 1, wherein:
   a) said dynamic granular material is at least one redox couple.

6. A filtration device as recited in claim 1, further comprising:
   a) a fluid additive mixed with said dynamic granular material.

7. A filtration device as in claim 1 wherein:
   a) said at least one outlet screen has a greater mesh size than said dynamic granular material.

8. A filtration device as recited in claim 7, wherein:
   a) said filtration device includes at least one valve with a valve filter attached to said container, whereby said valve when activated will allow said fluid to escape said container as well as said contaminants therein but not said dynamic granular material.

9. A filtration device as recited in claim 1 further comprising;
   a) contaminant removing means connected to said filtration device for removing from the filtration device contaminants that are extracted from the fluid.

10. A filtration device as recited in claim 1, wherein:
    a) said inlet and said inlet end have an ID of about ½".

11. A filtration device as recited in claim 1, wherein:
    a) said container has an ID of about 4" to about 8".

12. A filtration device as in claim 1 wherein:
    a) said another outlet screen has a mesh size of about 60 to about 100.

13. A filtration device as recited in claim 12, wherein:
    a) said another outlet screen has a mesh size of about 80.

14. A filtration device as in claim 1 wherein:
    b) said at least one outlet screen has a mesh size of about 120.

15. A filtration device as in claim 1 wherein:
    c) said another outlet screen is about ½" thick.

16. A filtration device as in claim 1 wherein:
    a) said at least one outlet screen is a stiff filter screen.

17. A filtration device as in claim 1, wherein:
    a) said diffusion agitating means located at said inlet end is a baffle.

18. A filtration device as in claim 1, wherein:
    a) said diffusion agitating means located at said inlet end is a nozzle.

19. A filtration device operating in the range of about 20 to about 100 psi for removing contaminants from fluids, comprising:
    a) a container having an interior chamber with a volume, an interior wall, at least one inlet, at least one outlet and at least one outlet screen;
    b) a dynamic granular bouncing, non-clumping, non-sticking, non-interlocking, non-clinging material occupying about 20% to about 67% of said volume of said container;
    c) said at least one outlet screen causing said dynamic granular bouncing, non-clumping, non-sticking, non-interlocking, non-clinging material to stay in an agitated condition without clogging said at least one outlet screen;
    d) said dynamic granular material having a mesh size of from about 80 to about 120;
    e) said at least one inlet having an inlet end extending into said container;
    f) said inlet and said inlet end having an ID of not less than about ⅛" and up to about ¾";
    g) said container have an ID of between about 2" to about 12";
    h) a diffusing agitating means located at said inlet end for arresting axial flow of said fluid from said inlet end and deflecting said fluid laterally of said inlet end toward said interior wall of said container;
    i) said at least one outlet screen having a mesh size of between about 100 to about 150;
    j) said diffusion agitating means located at said inlet end being a nozzle;
    k) said nozzle including downwardly angularly directed orifices;
    l) whereby when fluid is admitted into said container, said contaminants are removed from said fluid by the dynamic agitation of said dynamic granular material.

20. A filtration device as in claim 19, wherein:
a) said orifices have a diameter of about 1/32" to about 1/16".

21. A filtration device as in claim 19, wherein:
a) said nozzle includes about 4 to 12 orifices.

22. A filtration device as recited in claim 19, wherein:
a) said dynamic granular material occupies from about 35% to about 40% of said volume of said container.

23. A filtration device as recited in claim 19, wherein:
a) said dynamic granular material is activated carbon.

24. A filtration device as recited in claim 19, wherein:
a) said dynamic granular material is an ion-exchange resin.

25. A filtration device as recited in claim 19, wherein:
a) said dynamic granular material is at least one redox couple.

26. A filtration device as recited in claim 19, and including:
a) a fluid additive mixed with said dynamic granular material.

27. A filtration device as recited in claim 19, wherein:
a) said at least one outlet screen has a greater mesh size than said dynamic granular material.

28. A filtration device as recited in claim 27, wherein:
a) said filtration device includes at least one valve with a valve filter attached to said container, whereby said valve when activated will allow said fluid to escape said container as well as said contaminants therein but not said dynamic granular material.

29. A filtration device as recited in claim 19, further comprising:
a) a means for removing from the filtration device contaminants that are extracted from the fluid.

30. A filtration device as recited in claim 19, wherein:
a) said inlet and said inlet end have an ID of about ½".

31. A filtration device as recited in claim 19, wherein:
a) said container has an ID of about 4" to about 8".

32. A filtration device as in claim 19, and including:
a) another outlet screen adjacent said at least one outlet screen.

33. A filtration device as in claim 32, wherein:
a) said another outlet screen has a mesh size of about 60 to about 100.

34. A filtration device as in claim 33, wherein:
a) said another outlet screen has a mesh size of about 80.

35. A filtration device as in claim 32, wherein:
a) said another outlet screen is about ½" thick.

36. A filtration device as in claim 19, wherein:
a) said at least one outlet screen has a mesh size of about 120.

37. A filtration device as in claim 19, wherein:
a) said at least one outlet screen is a stiff filter screen.

* * * * *